Jan. 6, 1925. 1,522,406
W. J. BARGEN ET AL
SCHOOL ROOM FURNITURE
Filed Feb. 14, 1924 4 Sheets-Sheet 3
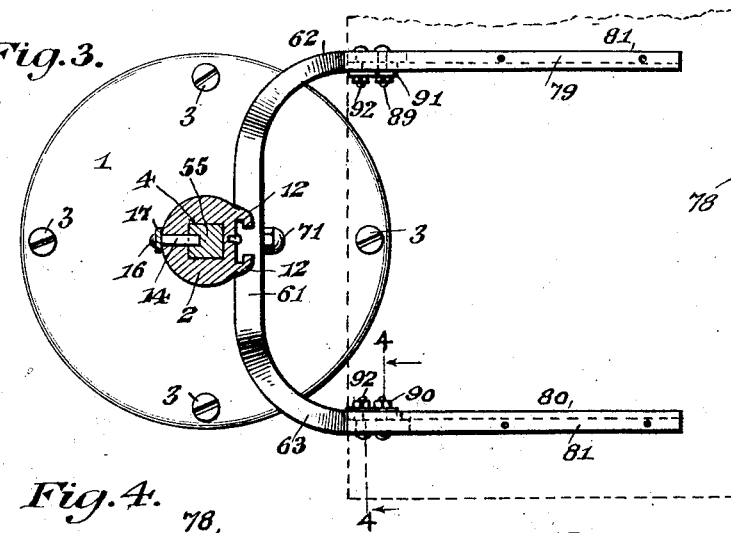
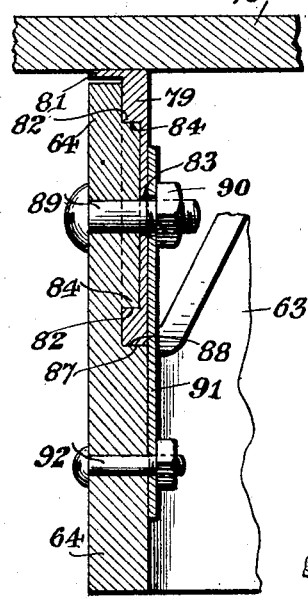
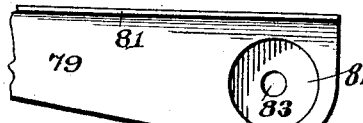
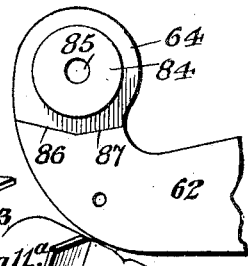
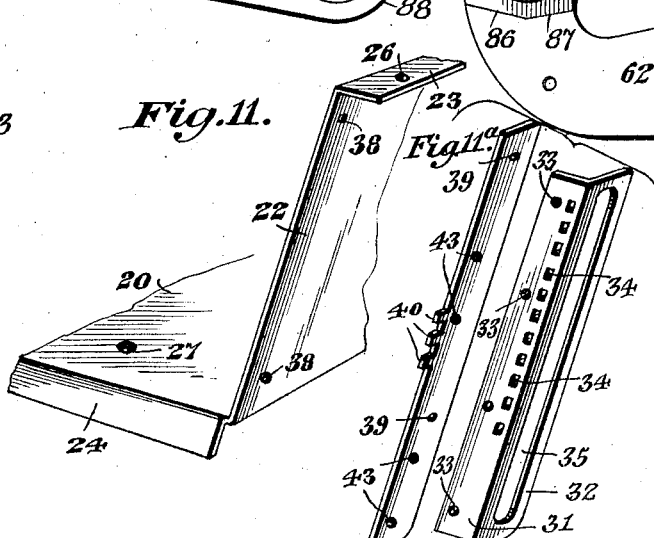
William J. Bargen INVENTORS
William R. Brennan,
BY
Geo. P. Kimmel.
ATTORNEY.

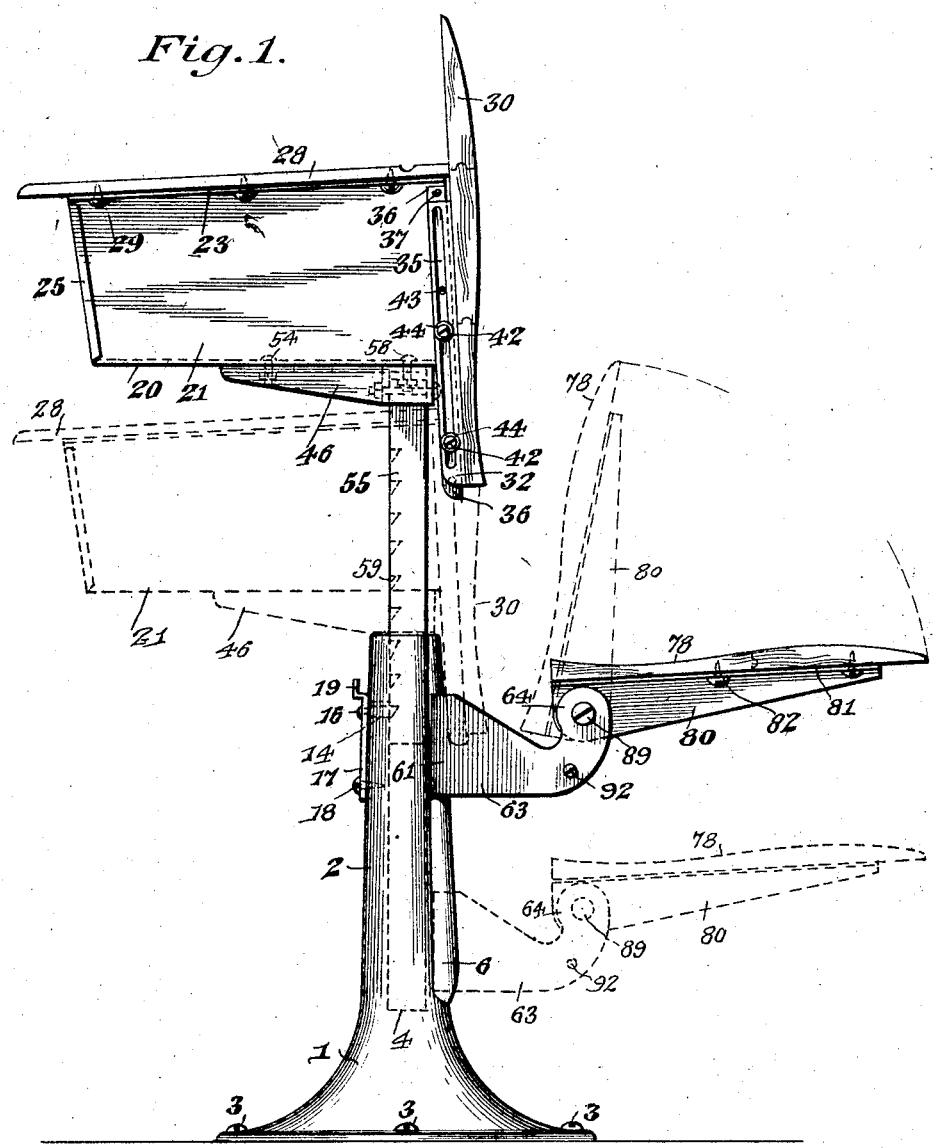

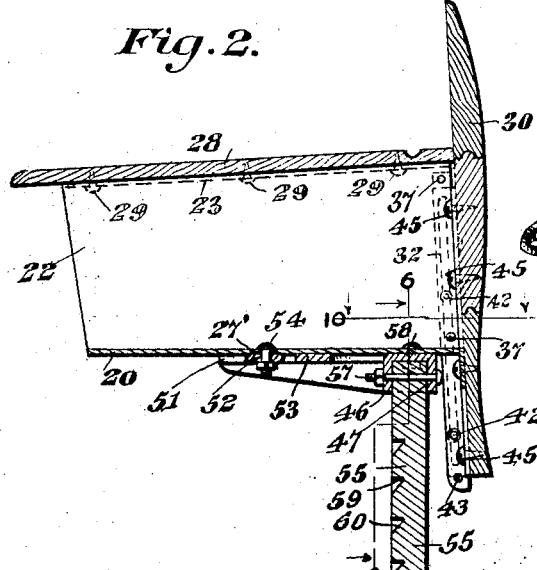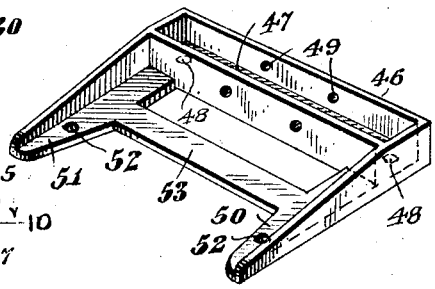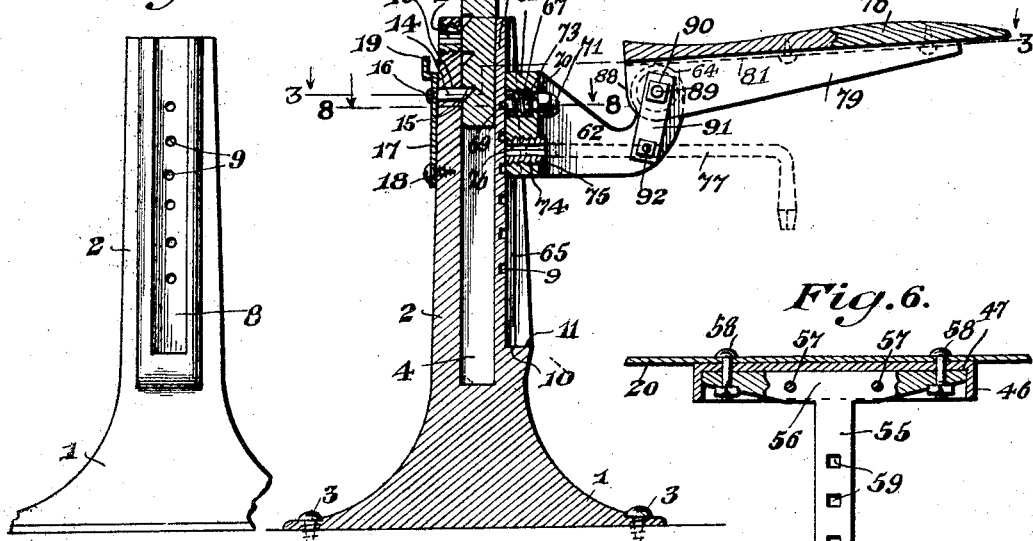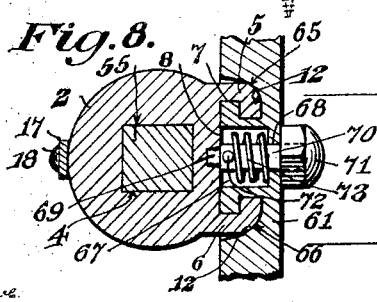

Jan. 6, 1925.　　　　　　　　　　　　　　　　　　　　　1,522,406
W. J. BARGEN ET AL
SCHOOL ROOM FURNITURE
Filed Feb. 14, 1924　　　　4 Sheets-Sheet 4
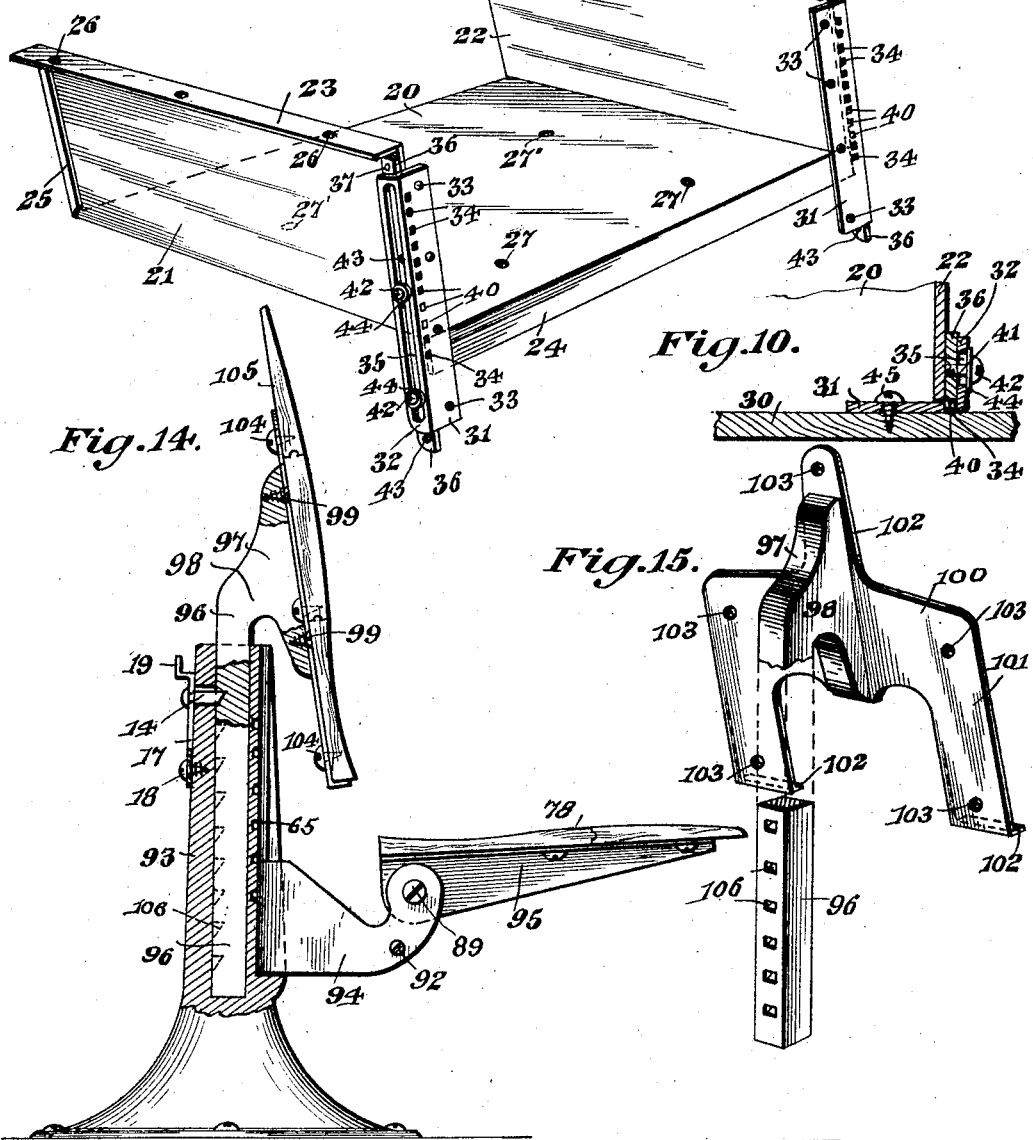
William J. Bargen, INVENTORS
William R. Brennan,
BY
Geo. P. Kimmel
ATTORNEY.

Patented Jan. 6, 1925.

1,522,406

UNITED STATES PATENT OFFICE.

WILLIAM J. BARGEN AND WILLIAM R. BRENNAN, OF MISSOULA, MONTANA.

SCHOOL-ROOM FURNITURE.

Application filed February 14, 1924. Serial No. 692,795.

*To all whom it may concern:*

Be it known that we, WILLIAM J. BARGEN and WILLIAM R. BRENNAN, citizens of the United States, residing at Missoula, in the county of Missoula and State of Montana, have invented certain new and useful Improvements in School-Room Furniture, of which the following is a specification.

This invention relates to furniture, more particularly to school room furniture, such as desks and seats, but it is to be understood that an article of furniture such as a combined desk and seat, or seat, in accordance with this invention can be employed or used for any purpose for which it is found applicable, and the invention has for its primary object to provide, in a manner as hereinafter set forth, an article of furniture of the class referred to, with means whereby when the article of furniture is used by a pupil it can be adjusted to afford maximum amount of comfort with respect to the disposition of the pupil's arms, feet and legs.

A further object of the invention is to provide, in a manner as hereinafter set forth, an article of furniture for school rooms, such as combined desk and seat and with the desk independently adjustable with respect to the seat and the seat capable of being independently adjustable with respect to the desk, thereby providing for the article of furniture to be used by pupils of various heights; and further, whereby the front wall of the desk body, which constitutes the back of the seat, is capable of being vertically adjusted relative to the seat, or to the desk body, to arrange the back at proper position to insure comfort to the pupil when using the seat.

A further object of the invention is to provide, in a manner as hereinafter set forth, an article of furniture for use in school rooms, such as a combined desk and seat, and with said article including a desk, seat back and seat, each independently adjustable with respect to the other, thereby providing for scientific seating for a child from a health standpoint; and whereby the setting up of the desk with seat, back, and top independently adjustable with respect to each other enables the providing of an article of furniture which permits the use of one set of elements so that at no time need the purchasing committee of the school find itself long on one size of seats or short on another, but will find itself buying seating economically; and furthermore the providing of an article of furniture which, through the manner of setting up the various elements and the assembling thereof, permits their interchanging to such an extent that any one of the three kinds of seats employed in school rooms, such as front, regular and rears can be set up from one structure.

Further objects of the invention are to provide, in a manner as hereinafter set forth, an article of furniture for use in school rooms, which is simple in its construction and arrangement, having three independent adjustments, strong, durable, compact, readily adjustable, thoroughly efficient in its use, quickly assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of an article of furniture such as a combined desk and seat, in accordance with this invention, and further illustrating in dotted lines the adjustment of the desk relative to the supporting pedestal and seat, and the adjustment of the seat relative to the supporting pedestal and desk, and further showing the seat shifted to dotted line position to permit of the passage of the pupil.

Figure 2 is a vertical longitudinal section of an article of furniture, such as a combined desk and seat, in accordance with this invention.

Figure 3 is a section on line 3—3, Figure 2, looking in the direction of the arrows.

Figure 4 is a section on line 4—4, Figure 3, looking in the direction of the arrows.

Figure 5 is a front elevation, broken away, of the supporting pedestal.

Figure 6 is a section on line 6—6, Figure 2, looking in the direction of the arrows.

Figure 7 is an inverted perspective view of the combined supporting and coupling bracket for the desk.

Figure 8 is a section on line 8—8, Figure 2, looking in the direction of the arrows.

Figure 8ᵃ is a perspective view of the clamping member for the seat supporting bracket.

Figure 9 is a perspective view of the desk body with the top and front walls removed and further illustrating the adjustable connection between the front and sides of the desk.

Figure 10 is a section on line 10—10, Figure 2, looking in the direction of the arrow.

Figure 11 is a fragmentary view, in perspective, of a part of the desk body.

Figure 11ᵃ is a grouped perspective of the adjustable coupling device for the front wall of the desk and such front wall constituting the seat back.

Figures 12 and 13 are fragmentary views illustrating the pivot or hinge between the seat and the supporting bracket for the latter.

Figure 14 is a sectional elevation of an article of furniture, set up as a rear seat, in accordance with this invention.

Figure 15 is a perspective view, broken away, looking to the rear of the adjustable seat back support.

An article of furniture, in accordance with this invention, is for use in connection with school rooms, and with reference to Figures 1 to 13 inclusive, comprises a supporting pedestal, a desk having its front wall constituting a vertically adjustable seat back, a vertically adjustable supporting element for the desk and which is adjustably mounted in the pedestal, a vertically adjustable seat support slidably connected with the pedestal, and a seat hinged to the seat support.

The supporting element for the desk is independently adjustable with respect to the seat support, and the latter is independently adjustable with respect to the adjustable supporting element for the desk. The front wall of the desk and which constitutes a seat back is adjustable independently of the vertically adjustable supporting element, and further independently adjustable with respect to the vertical adjustable seat support. By this arrangement three independent adjustments are had.

The supporting pedestal comprises a base 1 and a stem 2. When the pedestal is employed for supporting the desk and seat, it is fixedly secured in position by hold-fast devices 3 extending through the base thereof. Preferably the stem 2 is of tapered contour and the base 1 of flaring configuration and which terminates in and is integral with the stem 2. The pedestal is constructed of any suitable metallic material and may be cast or pressed.

The stem 2 is formed with a polygonal-shaped socket 4, which extends from the upper end of the stem 2 and terminates at a point in proximity to the point of joinder of the stem 2 with the base 1. The stem 2 near its top is provided with a threaded clamping element 2' of the same type as the clamping member 75 to be hereinafter referred to.

The forward face of the stem 2 is provided with a pair of oppositely disposed spaced forwardly projecting angle-shaped flanges 5, 6, which are the same in width from the upper to the lower end thereof and each of said flanges in connection with the stem 2 provides a pocket 7 and the said pockets are oppositely disposed with respect to each other. That portion of the forward face of the stem 2, which is arranged between the flanges 5 and 6, is plane throughout, as at 8, and centrally of the plane face of the stem 2 there is arranged a series of suitably spaced superposed sockets 9.

The forward face of the stem 2, in proximity to its lower end, is provided with an offset portion 10, having a flat top 11 and formed integral with the offset portion 10 is the lower termini of the flanges 5 and 6. The outer forward corner of each of the flanges 5 and 6 is rounded, as at 12.

The stem 2, near its upper end, is formed with a laterally disposed opening 13, which communicates with the socket 4, and shiftably mounted in the opening 13 is a locking member 14, having a bevelled inner end 15. The locking member 14 extends into the socket 4 and further projects outwardly with respect to the stem 2 and is fixedly secured, as at 16, to a resilient support 17, secured at its lower end, as at 18, against the outer face of the stem 2. The upper end of the support 17 is offset, as at 19, to provide a finger hold or grip. The support 17 normally retains the locking member 14 in the position shown in Figures 1 and 2, that is to say, extended into the socket 4 so as to be positioned in the path of the vertically adjustable supporting elements for the desk, to be hereinafter referred to, and said locking member 14 provides means for releasably securing the element in the position to which it has been adjusted. When the locking member 14 is moved outwardly, such movement is had against the action of the resilient supporting element 17, as the latter always tends to maintain the locking member 14 in its inward position, as shown in Figures 1 and 2.

The desk includes a U-shaped body portion, preferably constructed from thin sheet metal, which is bent to provide a desk bottom 20, a pair of side walls 21, 22, an outwardly projecting right angularly disposed flange 23 at the top of each wall 21 and a downwardly extending right angularly disposed flange 24 at the front end of the bottom 20. The material forming the side walls 21 and 22 is bent to provide a reinforcing flange 25 at the rear end of each of the walls 21 and 22. Each of the flanges 23 is provided with a series of openings 26 and the bottom 20 in proximity to the flange 24 has formed therein a pair of openings 27 and further provided rearwardly of the openings 27 with a pair of openings 27'.

The desk further includes a top 28, preferably constructed from wood and of one piece, although the top 28 can be formed of any suitable material, and said top 28 projects rearwardly from the walls 21 and 22 and slightly forward with respect to the forward ends of said walls 21 and 22. The top 28 is of greater width than the width of the body portion of the desk and said top 28 is secured in position by hold-fast devices 29 extending up through the openings 26 and engaging in said top 28.

The desk further includes an adjustable front wall, which furthermore constitutes a seat back and said front wall is indicated at 30 and is of substantial height for the purpose for which it is intended and preferably of materially greater height than the height of the body portion of the desk, so that the front wall 30 will extend above the top 28 and below the flange 24. As shown, the front wall 30 is formed of a plurality of sections suitably secured together, and with each of the sections formed of wood, but it is obvious that the front wall can be set up from a single piece of material and that the material can be other than wood. Preferably the forward face of the front wall 30 is of compound curvature and the rear face plain, but it is obvious that the front face can be of any curvature desired to afford comfort to the pupil when leaning against the seat back.

The front wall 30 is vertically adjustable relative to the body portion of the desk, and for such purpose a pair of adjustable coupling devices is provided and which not only perform the function of connecting the front wall with the body portion of the desk, but also provide means whereby the front wall can be vertically adjusted with respect to said body portion. As each of the coupling devices is of the same construction, but one will be described, as the description of one will apply to the other.

Each of the coupling devices consists of an angle-shaped member of substantial length comprising a forward arm 31 and a rear arm 32, and with the former disposed at right angles with respect to the latter, and projecting inwardly therefrom. The forward arm 31 is provided with a series of openings 33 near its free side edge and further provided with a row of superposed polygonal-shaped openings 34 in proximity to the point of joinder between the arms 31 and 32. The openings 34 are spaced in close relation. The arm 32 is formed with a lengthwise slot 35 which extends from a point in proximity to its upper end and terminates at a point in proximity to the lower end thereof.

Each coupling device further includes a suspension bar of substantial thickness and which is indicated at 36. The bar 36 is positioned against the outer face of a wall 21 or 22 at the forward end thereof, and is fixedly secured therewith by the hold-fast devices 37 engaging in the openings 38 in the side wall, and also in the openings 39 in the bar 36. Preferably the hold-fast devices 37 are countersunk in the bar 36. The forward side edge of the bar 36 has extending therefrom a set of spaced polygonal-shaped teeth 40, which engage into a series of openings of the row of openings 34 for maintaining the angle-shaped member in the position to which it has been vertically adjusted with respect to the body portion of the desk.

For the purpose of fixedly securing the angle-shaped member of the coupling device in the position to which it has been vertically adjusted, removable retaining members are provided, as shown two in number, and each of which is indicated at 41. Each retaining member comprises a threaded shank having its outer end formed with an enlarged head 42. Each of the shanks 41 of a retaining member extends through the slots 35 and has threaded engagement with the wall of an opening of the plurality of openings 43 provided in the bar 36. Interposed between the head 42 of a retaining member and the outer face of the bar 36, is a washer 44. Although but two retaining members are shown in connection with each coupling device, yet it is obvious that the number thereof can be increased if desired. The retaining members fixedly secure the angle-shaped members to the bars 36, due to the threaded engagement of the retaining members with the bar 36 in connection with the heads 42 bearing against the washers 44, which abut against the outer face of the bar 36. The slot 35 in the arm 32 permits of the shifting of an angle-shaped member of a coupling device vertically when the retaining members are moved from clamping position and by this arrangement it does not necessitate the entire removal of the retaining member when it is desired to shift an angle-shaped member.

The front wall 30 is arranged against the arms 31 and project outwardly in a lateral direction with respect thereto, and said front wall 30 is secured to the arms 31 by hold-fast devices 45 extending through the openings 33 and engaging in the front wall 30 from the rear thereof, and whereby the angle-shaped members of the coupling devices are permanently connected to the front wall 30.

The vertically adjustable supporting element for the desk comprises a combined supporting and coupling bracket and a headed vertically adjustable standard. The bracket consists of a hollow rectangular body portion 46, closed at its top and open at its bottom and disposed transversely with respect to the bottom 20 of the body portion of the desk and which provides a rectangular socket 47. The top of the body portion is formed with a pair of openings 48 which register with the openings 27. The front, as well as the rear wall of the socket 47, is formed with a pair of spaced openings 49. Formed integral with each end of the body portion 46 and extending rearwardly therefrom is a pair of oppositely disposed angle-shaped arms 50, 51, each having a vertically disposed portion and a horizontally disposed portion projecting inwardly from the top of the vertical portion and formed with an opening 52. The horizontal portions of the arms 50, 51, are connected together by a brace member 53. The openings 52 register with the openings 27′, and extending therethrough are hold-fast devices 54 for connecting said arms 50, 51 to the bottom 20 of the body portion of the desk. The vertically adjustable standard is indicated at 55, is of substantial length and conforms in contour to the shape of the socket 4 and said standard 55 is positioned and vertically adjustable in the socket 4 and further has a snug sliding fit with the walls of said socket 4. The standard 55, at its upper end, is formed with a head 56 which projects at right angles thereto and in opposite directions, and said head 56 is of a length substantially equal to the length of the socket 47. The head 56 gradually decreases in height from a point removed from each side of the standard 55 to each end of the head. The length and width of the head 56, are such as to provide a snug fit therebetween and the walls of the socket 47. The head 56 is secured to the front and rear walls of the socket 47 by hold-fast devices 57 which extend through openings 49 in said walls, and also through the head 56 at each side of the standard 55. The body portion 46 and head 56 may be set up as a single unit if desired.

The rectangular body portion 46 of the combined supporting and coupling bracket is secured to the bottom 20 of the body portion of the desk by the hold-fast devices 58 which extend through the registering openings 27 and 48, and said hold-fast devices further extend through the head 56 near each end thereof, so that the head 56, body portion 46 and bottom 20 will be fixedly secured together.

The rear face of the standard 55, is formed with a row of superposed sockets 59, each having a bevelled lower wall 60. The locking member 14 carried by the standard 2, engages in any one of the sockets 59 for the purpose of maintaining the standard 55 in the position to which it has been adjusted. The locking member 14 prevents the downward movement of the standard 55, but owing to the sockets having the bevelled lower walls 60, the locking member 14 does not interfere with an upward shift of the standard 55 when desired, and this is due to the fact that as the standard 55 moves upwardly the bevelled end of the locking member 14 will shift off of the bevelled wall 60 against the action of the resilient support 17.

The manner of setting up the vertically adjustable supporting element for the desk with respect to the latter and also with respect to the pedestal permits of the vertical adjustment of the desk to the desired height and further that such vertical adjustment is had independent of the manner of adjusting the front wall 30 relative to the desk body.

The vertically adjustable seat support, which is slidably connected with the stem 2, consists of a rectangular bar 61 of substantial length, width and thickness and which terminates at each end in a curved forwardly extending arm, as indicated at 62, 63. Each of the arms has an upstanding portion at its free or forward end, as indicated at 64. The bar 61 on its rear face is provided with a pair of angle-shaped sockets 65, 66, and with the outer side wall of each of the sockets flared slightly and further curved to conform to the curvature of the forward outer corners of the flanges 5 and 6. The bar 61 is slidably mounted on the flanges 5 and 6 for the purpose of connecting the seat support to the stem 2. The bar 61 is mounted on the flanges 5 and 6 from the top thereof. The bar 61 has its rear face further provided with a recess 67 and communicating with the bottom of said recess is an opening 68 which extends from the front side of the bar 61. The opening 68 is of materially less diameter than the diameter of the recess 67. Extending through the opening 68, as well as through the recess 67 and further having a reduced rear terminal portion 69, is a spring controlled locking member 70 having its outer end formed with a head 71, which abuts against the outer side of the bar 61. The locking member 70 is provided with a lug 72 and interposed between the latter and the bottom of the recess 67, as well as surrounding the locking member 70, is a coiled spring 73, which normally maintains the head 71 against the outer face of the bar 61 and further maintains the reduced inner terminal 69 of the locking member 70 in one of the sockets 9. The locking member 70 in connection with a socket 9 maintains the seat support in the position to which it has been adjusted.

For the purpose of clamping the seat support in its adjusted position, the bar 61 below the recess 67 is provided with a transversely extending opening 74, formed with a threaded wall, and threadably engaging with said wall is a peripherally threaded clamping member 75 provided with a polygonal-shaped bore 76 from end to end thereof. The clamping member 75 is of a length greater than the thickness of the bar 61 and projects forwardly therefrom. The clamping member 75, after the seat has been adjusted, is forced inwardly against the flat face 8 of the stem 2 and which sets up a clamping action and forces the walls of the sockets 65 and 66 to bind against the flanges 5 and 6, whereby the seat support is fixedly secured in its adjusted position.

As illustrated in dotted lines in Figure 2, a tool or other implement 77 is shown in connection with the clamping member 75, for the purpose of shifting it to or from clamping position, and the tool has a polygonal-shaped end for engagement with the wall of the polygonal-shaped bore 76, so that when the tool is revolved the clamping member 75 will be carried therewith. If the tool is revolved in a clockwise direction the member 75 will be shifted to clamping position and if revolved in an anti-clockwise direction the member 75 will be withdrawn from clamping position.

The hinged seat consists of a body portion 78 of any suitable material and with its upper face curved in any desired manner and further set up of the desired width and length and is carried by a pair of spaced tapered supporting members 79 and 80. Each of the members 79, 80 is formed at its top with an outwardly extending flange 81, through which extends hold-fast devices 82 for fixedly securing the body portion 78 to the supporting members 80.

The outer face, at the rear end of a supporting member 79 or 80, is formed with a circular pocket 82, and each of said members at its rear end is provided with an opening 83 which communicates with the pocket 82. The inner face of the upstanding portion 64, of either of the arms 62 or 63, is formed with a circular enlargement 84, which corresponds to the diameter of a pocket 82 and is seated therein, and each of the enlargements 84 has a snug sliding fit with the wall of the pocket 82. The upstanding end 64 of an arm 62 or 63 is provided with an opening 85 which registers with an opening 83. Below the enlargement 84, the upstanding portion 64 is provided with a pair of oppositely extending inclined shoulders 86, 87, against which rides the curved lower rear corner 88 of a supporting member 79 or 80. Extending through the registering openings 83 and 85 is a headed bolt 89, provided on its inner end with a securing nut 90. The bolts 89 provide means for connecting the members 79 and 80 to the upstanding end 64 of the arms 62 and 63. When the members 79 and 80 are connected to the upstanding ends 64 of the arms 62 and 63, the flanges 81 of the members 79 and 80 overlap the top of the upstanding end 64. Mounted on each bolt 89, as well as depending therefrom, is a strap 91, which has its lower end connected by a hold-fast device 92 to an arm 62 or 63. The strap 91, at its upper end, is interposed between the member 79 or 80 and a nut 90.

The providing of the circular enlargements 84 on the upstanding ends 64 of the arms 62 and 63 and the seating of said circular enlargements 84 in the pockets 82, overcomes the riding of the supporting members 79 and 80 upon the bolts 89, as when the seat is shifted the walls of the pockets 82 will ride against the enlargements 84 and which constitute the pivot of the hinge. The shoulders 86 and 87 overcome the necessity of employing lugs, as stops, when the seat is swung to front position or to rear position and when swung to front position the lower edge of the members 79 and 80 seat on the shoulders 86, and when swung to rear position the rear edge of the members 79 and 80 seats on the shoulders 87. The rounded inner lower corners of the members 80 and 81 provide a clearance with respect to the shoulders 86 and 87, when the seat is shifted to its lowered or forward position or to its rear or upstanding position.

With respect to the construction shown in Figures 14 and 15, relating to what may be termed a rear seat, the construction differs only with respect to the vertically adjustable standard mounted in the pedestal. In the application of the invention for the purpose of setting up a rear seat, the pedestal, which is indicated by the reference character 93, the adjustable seat support indicated at 94, and the seat indicated at 95 and its hinged connection, are the same in construction as that referred to in connection with Figures 1 to 13, and, therefore, it is thought unnecessary to specifically describe the said elements.

The standard indicated at 96 corresponds in construction to the standard 55, with the exception that the head 97 of the standard 96 is differently arranged from that of the head 56 of the standard 55. The head 97 is disposed at an inclination and is formed with a rearwardly extending and downwardly inclined shank 98, which terminates in the upper end of the standard 96. The head 97 is projected forwardly with respect to the standard 96 and is disposed at an inclination and has the lower portion thereof opposing the upper terminal portion of the standard 96. Secured to the head 97 by the hold-fast devices 99 is an inverted yoke-shaped supporting bracket 100, having the lower terminal of each arm 101 thereof extending forwardly at an angle, as at 102, providing a support. The bracket 100, centrally thereof, has an upstanding arm 102. When the head 97 is secured to the bracket 100 it is arranged centrally of said bracket and is further positioned against the rear face of the arm 102. The bracket 100 has openings 103 for the passage of hold-fast devices 104 to secure the seat back 105 to the bracket 100, and said seat back is formed from the front wall of the desk. The standard 96 has sockets 106 of the same contour as the sockets 59 for the reception of the locking member 14. The standard 96 and bracket 100 may be casted or pressed in a unit.

The arrangement shown in Figures 14 and 15 provides for what may be termed a rear seat and with the seat back independently adjustable with respect to the seat and with the latter independently adjustable with respect to the seat back. The adjustments in both instances are vertical.

An article of furniture, such as a combined desk and seat, set up in the manner as illustrated and described permits of the desk being adjusted to the desired height by releasing the locking member 14 from engagement with the standard, and further permits of the seat to be adjusted to the desired height by releasing the retaining member and clamping member, and also permits of the vertically adjusting of the seat back to the desired position, and with the adjustment of the seat back independent of the adjustment for the seat, and the adjustment of the desk independent of the adjustment of the seat back and the seat.

By setting up the article of furniture from one set of castings, and owing to the independent adjustability of the desk, seat back and seat, the same construction of article may be used throughout the school, from the first grade through the high school, and which is possible, due to the independent adjustment referred to.

By setting up the device from one set of castings and through the omission or removal or insertion of certain parts, the following constructions are provided, a regular seat, a front seat and a rear seat, so, therefore, it is not necessary to make a special front or a special rear or a special regular, as an article of school furniture constructed in accordance with this invention embodies the three features referred to. By way of example, in the article of furniture as described, if the desk is removed and the bracket 100 with the seat back secured thereto is mounted in the pedestal, then the rear seat is set up. If a regular is wanted, the bracket 100 is removed and the desk inserted. If a front seat is wanted, the seat supporting bracket is removed and the front seat is ready. Inversely when a regular is wanted, the seat supporting bracket is again supported in position and the structure is complete. Therefore, an article of furniture for school rooms is set up possessing the advantage of interchangeability.

It is thought that the many advantages of an article of furniture, such as a combined desk and seat, or a seat for school rooms or other purposes, constructed in accordance with this invention, can be readily understood, and although the preferred embodiment of the invention is as described and illustrated, yet it is to be understood that changes in the details of construction can be had which will fall within the scope of the invention as claimed.

What we claim is:—

1. An article of furniture for the purpose set forth comprising a pedestal provided with a socket extending lengthwise thereof and a pair of oppositely disposed lengthwise extending angle-shaped spaced flanges projecting forwardly therefrom, said socket and flanges extending from the top and terminating below the transverse center of said pedestal, a vertically adjustable supporting element slidably mounted in said socket, a vertically adjustable supporting element slidably connected with the pedestal by said flanges, spring controlled means carried by said pedestal and engaging in the rear of one of said elements for retaining it in adjusted position, spring controlled means carried by the other of the elements and engaging in the front of the pedestal for retaining the element in adjusted position, and a clamping member carried by and threadedly engaging with said last mentioned element and abutting against the front of the pedestal for clamping each element in adjusted position.

2. An article of furniture for the purpose set forth comprising a pedestal, a pair of vertically adjustable supporting elements mounted therein and one independently adjustable with respect to the other, a desk connected to one of said elements and including a front wall, said desk having means to provide for the vertical adjustment of said wall and said wall of a height to cooperate with the seat to constitute permanently a back therefor, and a seat hinged to the other of said elements.

3. An article of furniture for the purpose set forth comprising a pedestal, a pair of vertically adjustable supporting elements mounted therein, one of said elements independently adjustable with respect to and arranged rearwardly of the other, a desk connected to one of said elements and including a front wall, said desk having means to provide for the vertical adjustment of said wall and said wall of a height to cooperate with the seat to constitute permanently a back therefor, and a seat hinged to the other of said elements.

4. An article of furniture for the purpose set forth comprising a pedestal provided with a socket extending lengthwise thereof and a pair of angle-shaped spaced flanges projecting forwardly therefrom, a vertically adjustable supporting element slidably mounted in said socket, a vertically adjustable supporting element slidably connected with the pedestal by said flanges, a desk connected to one of said elements and including a front wall, said desk having means to provide for the vertical adjustment of said wall and said wall of a height to cooperate with the seat to constitute permanently a back therefor, and a seat hinged to the other of said elements.

5. An article of furniture for the purpose set forth comprising a pedestal, a pair of vertically adjustable supporting elements mounted therein and one independently adjustable with respect to the other, spring controlled means carried by said pedestal and engaging in one of said elements for retaining it in adjusted position, spring controlled means carried by the other of the elements and engaging in the pedestal for retaining the element in adjusted position, a desk connected to one of said elements and including a front wall, said desk having means to provide for the vertical adjustment of said wall and said wall of a height to cooperate with the seat to constitute permanently a back therefor, and a seat hinged to the other of said elements.

6. An article of furniture for the purpose set forth comprising a pedestal, a pair of vertically adjustable supporting elements mounted therein, one of said elements independently adjustable with respect to and arranged rearwardly of the other, spring controlled means carried by said pedestal and engaging in one of said elements for retaining it in adjusted position, spring controlled means carried by the other of the elements and engaging in the pedestal for retaining the element in adjusted position, a desk connected to one of said elements and including a front wall, said desk having means to provide for the vertical adjustment of said wall and said wall of a height to cooperate with the seat to constitute permanently a back therefor, and a seat hinged to the other of said elements.

7. In an article of furniture for the purpose set forth a pedestal comprising a base having a stem, said stem formed with a lengthwise extending socket opening at the top thereof and further provided at its front with a pair of spaced oppositely disposed lengthwise extending angle-shaped flanges and a row of superposed sockets between the flanges, a resilient element having its lower end fixed to the rear of the stem, and a locking member carried by said element and extending into the stem and further normally projecting into said lengthwise socket.

8. In an article of furniture for the purpose set forth a seat, a desk positioned above the seat and consisting of a pair of side walls and a bottom, a top secured to the side walls, a vertically disposed front of a length greater than the height of the body portion to coact with the seat to constitute the back therefor, and means for removably and adjustably connecting the front to the body portion.

9. An article of furniture for the purpose set forth comprising a pedestal, a vertically adjustable standard mounted therein, a desk carried by the standard and including a vertically adjustable front wall of greater height than the height of the desk and cooperating with the seat to constitute a permanent back therefor, means carried by the desk to provide for the adjusting of said front wall independent of the adjusting of the standard, a vertically adjustable seat support connected with the pedestal and independently adjustable with respect to said standard and front wall, and a seat hinged to said support.

10. An article of furniture for the purpose set forth comprising a pedestal, a vertically adjustable standard mounted therein, a desk carried by the standard and including a vertically adjustable front wall of greater height than the height of the desk and cooperating with the seat to constitute a permanent back therefor, means carried by the desk to provide for the adjusting of said front wall independent of the adjusting of the standard, a vertically adjustable seat support connected with the pedestal and independently adjustable with respect to said standard and front wall, a seat hinged to said support, said support and pedestal having coacting means for detachably retaining said support in adjusted position, and said pedestal and standard having coacting means for supporting and retaining said standard in adjusted position.

11. An article of furniture for the purpose set forth comprising a pedestal, a vertically adjustable standard mounted therein, a desk carried by the standard and including a vertically adjustable front wall of greater height than the height of the desk and cooperating with the seat to constitute a permanent back therefor, means carried by the desk to provide for the adjusting of said front wall independent of the adjusting of the standard, a vertically adjustable seat support connected with the pedestal and independently adjustable with respect to said standard and front wall, a seat hinged to said support, said support and pedestal having coacting means for detachably retaining said support in adjusted position, said pedestal and standard having coacting means for supporting and retaining said standard in adjusted position, and means carried by the support and engaging with the standard for clamping the support in adjusted position.

12. In an article of furniture for the purpose set forth a pedestal having its front formed with a pair of spaced oppositely disposed lengthwise extending flanges, said flanges extending from the top of the pedestal and extending below the transverse center thereof, a vertically adjustable seat support having its rear face provided with a pair of oppositely extending angle-shaped sockets for the reception of said flanges to slidably connect the support to the pedestal, shiftable means threadedly connected to the support and abutting against the front of the pedestal for clamping the support and flanges together, said pedestal further formed with a series of superposed sockets between said flanges, and a spring controlled element carried by the support and selectively engaging in said superposed socket for detachably retaining said support in adjusted position.

13. In an article of furniture for the purpose set forth a pedestal having its front formed with a pair of spaced oppositely disposed lengthwise extending flanges, said flanges extending from the top of the pedestal and extending below the transverse center thereof, a vertically adjustable seat support having its rear face provided with a pair of oppositely extending angle-shaped sockets for the reception of said flanges to slidably connect the support to the pedestal, shiftable means threadedly connected to the support and abutting against the front of the pedestal for clamping the support and flanges together, said support formed with a pair of arms, and a pair of seat supporting members connected to said arms, said arms and members having inherent means to provide pivots for the members.

14. In an article of furniture for the purpose set forth a pedestal having its front formed with a pair of spaced oppositely disposed lengthwise extending flanges, said flanges extending from the top of the pedestal and extending below the transverse center thereof, a vertically adjustable seat support having its rear face provided with a pair of oppositely extending angle-shaped sockets for the reception of said flanges to slidably connect the support to the pedestal, shiftable means threadedly connected to the support and abutting against the front of the pedestal for clamping the support and flanges together, said pedestal further formed with a series of superposed sockets between said flanges, a spring controlled element carried by the support and selectively engaging in said superposed socket for detachably retaining said support in adjusted position said support formed with a pair of arms, and a pair of seat supporting members connected to said arms, said arms and members having inherent means to provide pivots for the members.

15. An article of furniture for the purpose set forth comprising a pedestal, a vertically adjustable seat support slidably connected with and projecting forwardly from the front of the pedestal, a vertically adjustable desk support extending into the pedestal rearwardly of said seat support, a desk carried by its support and having its front wall vertically adjustable and of a height to coact with a seat to permanently constitute a back therefor, and a seat carried by said support.

16. An article of furniture for the purpose set forth comprising the combination with a support having an angularly disposed head at the top thereof, of a combined supporting and coupling bracket adapted to be secured to a desk and including a body portion provided with a socket for the reception of said head and further provided with a pair of rearwardly extending angle-shaped arms, and means for securing said body portion and head together.

17. An article of furniture for the purpose set forth comprising the combination with a support having an angularly disposed head at the top thereof, of a combined supporting and coupling bracket adapted to be secured to a desk and including a body portion provided with a socket for the reception of said head and further provided with a pair of rearwardly extending angle-shaped arms, and means for securing said body portion and head together, said head being rectangular in contour and corresponding to the shape of said socket.

18. An article of furniture for the purpose set forth comprising the combination with a support having an angularly disposed head at the top thereof, of a combined supporting and coupling bracket adapted to be secured to a desk and including a body portion provided with a socket for the reception of said head and further provided with a pair of rearwardly extending angle-shaped arms, means for securing said body portion and head together, and means for connecting said head and body portion together and for further connecting the desk to the body portion.

19. An article of furniture for the purpose set forth comprising the combination with a support having an angularly disposed head at the top thereof, of a combined supporting and coupling bracket adapted to be secured to a desk and including a body portion provided with a socket for the reception of said head and further provided with a pair of rearwardly extending angle-shaped arms, transversely extending means for connecting the head and body portion together, and vertically extending means for connecting the head and body portion together and further for connecting the desk to said body portion.

20. An article of furniture for the purpose set forth comprising a desk body including a forward wall of a length greater than the height of the desk body to coact with a seat to constitute a seat back, said forward wall having its outer face of compound curvature in the direction of the length thereof, and means carried by said forward wall and connected with the side walls of the desk body to provide for the vertical adjustment of said wall and further for connecting said wall in adjusted position with respect to the side walls of the desk body.

21. An article of furniture for the purpose set forth comprising a desk body having its forward wall of a length greater than the height of the side walls, said forward wall being vertically adjustable and coacting with a seat to provide a back therefor, and means carried by the front wall and adjustably connected with the side walls for maintaining the front wall in adjusted position.

22. An article of furniture for the purpose set forth comprising a desk body having a vertically adjustable front wall having its forward face of compound curvature extending lengthwise thereof, said wall of greater height than the height of the side walls of said body and coacting with a seat to constitute a back therefor, and means carried by said front wall and detachably connected with said side walls to provide for vertically adjusting the front wall and to secure the latter in adjusted position.

In testimony whereof, we affix our signatures hereto.

WILLIAM R. BRENNAN.
WILLIAM J. BARGEN.